United States Patent
Iwanaga

[11] 4,248,262
[45] Feb. 3, 1981

[54] CAPPING OF AUTOMATIC TRANSMISSION GOVERNOR CASE

[75] Inventor: Kazuyoshi Iwanaga, Yokohama, Japan

[73] Assignee: Nissan Motor Co., Ltd., Yokohama, Japan

[21] Appl. No.: 952,172

[22] Filed: Oct. 17, 1978

[30] Foreign Application Priority Data

Sep. 7, 1978 [JP] Japan .......................... 53-122079[U]

[51] Int. Cl.$^3$ ............................................ F16K 35/00
[52] U.S. Cl. .................... 137/382; 220/85 P; 220/319
[58] Field of Search ................. 137/377, 381, 382; 220/319, 320, 85 P

[56] References Cited

U.S. PATENT DOCUMENTS

| | | | |
|---|---|---|---|
| 1,413,502 | 4/1922 | Steinmetz | 137/382 |
| 3,272,224 | 9/1966 | Wrenshall | 137/382 |
| 4,004,684 | 1/1977 | Scollins | 220/319 |

FOREIGN PATENT DOCUMENTS 1155151 10/1963 Fed. Rep. of Germany ......... 220/85 P Primary Examiner—Martin P. Schwadron
Assistant Examiner—A. Michael Chambers
Attorney, Agent, or Firm—Thomspon, Birch, Gauthier & Samuels

[57] ABSTRACT

A cap member to cover a cylindrical portion of a governor case of an automatic transmission is shaped to have a cylindrical wall as its open end portion with an inner diameter larger than the outer diameter of the cylindrical portion of the governor case, and a plurality of circumferentially arranged arcuate slits are formed at intervals in the cylindrical wall of the cap. The cap put on the governor case is easily and quickly fastened by means of a resilient fastener wire which is curved into a generally arcuate shape and bent locally so as to form a plurality of V-shaped inward projections at intervals corresponding to the intervals between the slits of the cap. The fastening is completed by fitting the fastener wire around the cylindrical wall of the cap and inserting the inward projections respectively into the slits of the cap. Preferably an annular flange is formed in the cylindrical portion of the governor case as a retainer for the fastener wire.

8 Claims, 5 Drawing Figures

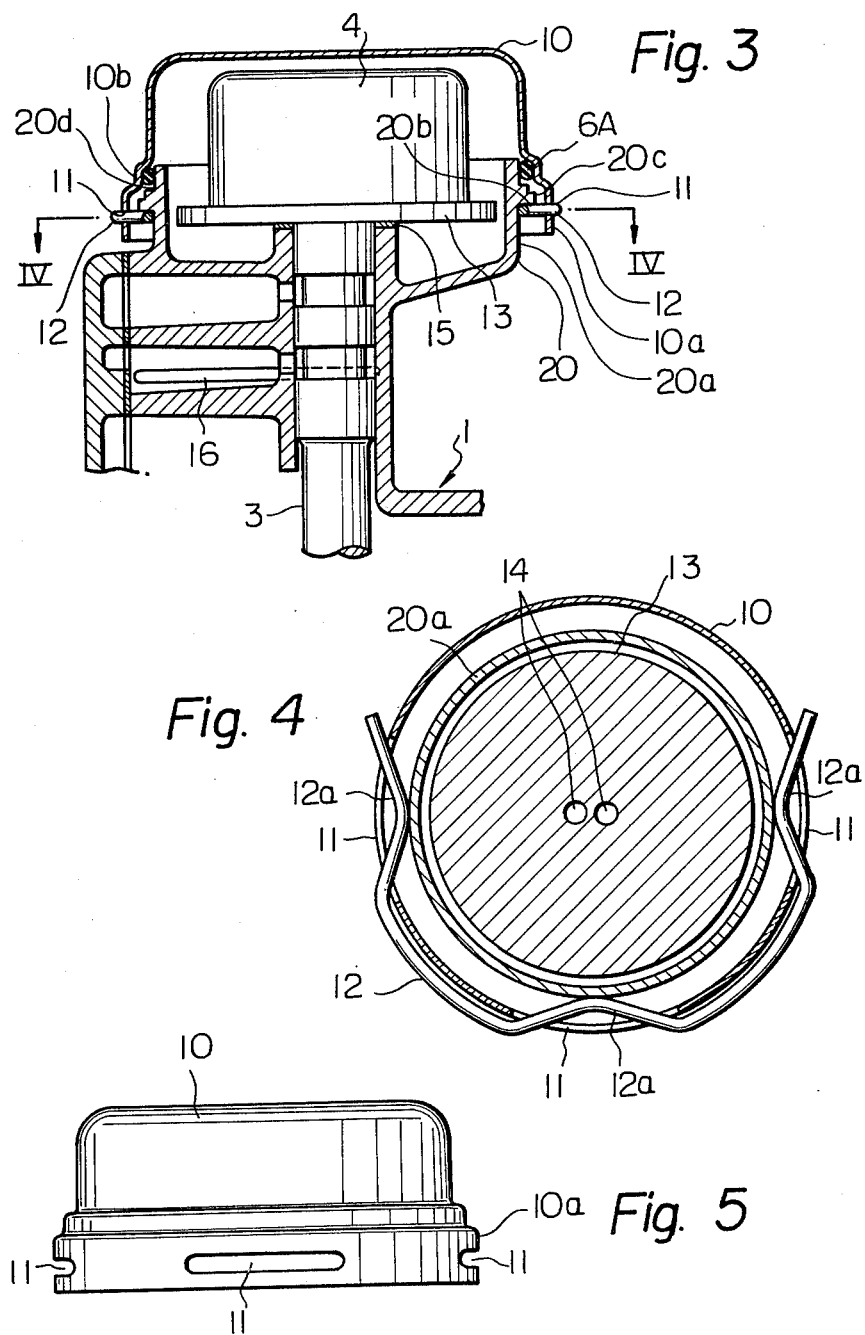

CAPPING OF AUTOMATIC TRANSMISSION GOVERNOR CASE

BACKGROUND OF THE INVENTION

This invention relates to an article having a cylindrical portion fitted with a cap member, and more particularly to means for detachably fastening the cap member to the cylindrical portion of the article. A typical embodiment of the invention is a capped governor case in an automatic transmission for automobiles.

There are various articles having a generally cylindrical portion covered with a detachably fastened cap member. In automobile industries, a typical example of such articles is a capped governor case in which is encased a governor valve, or governor valves, to produce a governor pressure as a control hydraulic pressure in an automatic transmission.

According to a typical conventional method of detachably fastening a cap member to, for example, an automatic transmission governor case, an external screw thread is cut on the cylindrical portion of the governor case and an internal screw thread is cut in the cap member, so that the cap is fastened by turning it on the governor case. Another conventional capping method is the use of bolts. In this case, an article such as a governor case to be capped is made to have a flange around the cylindrical portion and several tapped holes are formed in the flange in a circumferential arrangement, whereas a cap member is formed with bolt holes in compliance with the tapped holes in the flange of the case.

From an industrial viewpoint, a disadvantage common to these conventional capping methods is the necessity for time-consuming machining processes to cut the screw threads. Furthermore, fastening of caps by either of these methods requires increased time and labor costs. Besides, unfastening of the fastened cap according to the need cannot be accomplished quickly.

SUMMARY OF THE INVENTION

It is an object of the present invention to obviate the above described disadvantages of conventional capping of an article having a generally cylindrical portion.

It is another object of the invention to provide an article having a cylindrical portion and a cap member detachably fastened to the cylindrical portion of the article with a single fastener, wherein neither the article nor cap is formed with any screw threads and the fastener can be easily and quickly fitted to, and removed from, the capped article.

It is a still another object of the invention to provide an automatic transmission governor case fitted with a cap in a cylindrical portio thereof, wherein fastening of the cap to the governor case is accomplished, without using any screw threads, by means of a single fastener which can be easily and quickly fitted to, and removed from, the cap put on the governor case.

The present invention comprises an article having a cylindrical portion, a cap member whiich has, as an open end portion thereof, a cylindrical wall having an inner diameter larger than the outer diameter of the cylindrical portion of the aforementioned article and is arranged such that the cylindrical wall surrounds the cylindrical portion of the article either over the entire length of this portion or partly. The cylindrical wall of the cap member is formed with a plurality of arcuate slits in a circumferential arrangement and at intervals therebetween. This invention further comprises a resilient fastener wire which is curved into a generally arcuate shape and is locally bent so as to form a plurality of generally V-shaped inward projections at intervals corresponding to the intervals between the slits in the cap member. This fastener wire is fitted around a part of the periphery of the cylindricl wall of the cap member such that the inward projections are respectively inserted into the slits of the cap member until the apex of each projection comes into contact with the cylindrical portion of the capped article, wereby the cap member is fastened to the article.

An automatic transmission governor case according to the invention has a cylindrical portion, and a cap member according to the above statement is fastened to the cylindrical portion of the governor case with a fastener wire according to the above statement.

Preferably, the above described article, or the above described governor case, is formed with an annular flange in the cylindrical portion such that, when the cap member and the fastener wire are assembled with the article, the flange is located between the fastener wire and the open end of the cylindrical portion of the article. In this case the slits of the cap member are formed at such locations that the inward projections of the fastener wire inserted into the slits come into contact with an annular surface of the flange, wereby the flange serves as a retainer for the fastener wire.

BRIEF DESCRIPTION OF THE DRAWINGS

FIG. 3 shows, in a sectional view, a capped governor case of an automatic transmission as an embodiment of the present invention;

FIG. 4 is a sectional view taken along the line IV—IV of FIG. 3; and

FIG. 5 is an elevational view of the cap member used in the assembly of FIG. 3.

DESCRIPTION OF THE PREFERRED EMBODIMENTS

Capping of a governor case in an automatic transmission for automobiles will be taken as an industrially important embodiment of the present invention. In advance of the description of the embodiment, conventional capping methods for governor cases will be outlined with reference to FIGS. 1 and 2.

Figure 1:
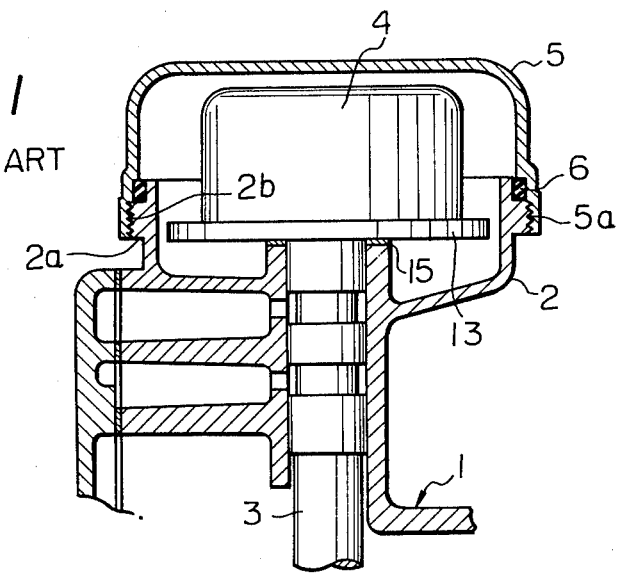
FIGS. 1 and 2 illustrate, in sectional views, two kinds of conventional capping methods for a governor case of an automotive automatic transmission.

In FIG. 1, a governor case 2 having a circular open end is formed as an integral part of a transmission case 1 in an automatic transmission. A governor shaft 3, which is rotated by the rotation of the output shaft (not shown) of the automatic transmission, extends into the governor case 2 and is joined to a base plate 13, on which is mounted a governor valve body 4. Indicated at 15 is a thrust washer. The governor case 2 is formed with an annular flange 2a at a short distance from the open end, and an external screw thread 2b is cut on the rim face of this flange 2a. A bowl-shaped cap 5 for this governor case 2 is cylindrical in its open end portion, and an internal screw thread 5a corresponding to the external screw thread 2b on the governor case 2 is cut in this portion of the cap 5. As is apparent, fastening of the cap 5 to the governor case 2 is accomplished by turning the threaded cap 5 on the governor case 2. Usually, an O-ring 6 is fitted around the govenor case 2 in an endmost portion above the flange 2a, and the inner diameter of the cap 5 in a portion adjacent the screw tread 2a is reduced such that the O-ring 6 is adequately squeezed when the cap 5 is put on the governor case 2.

Figure 2:
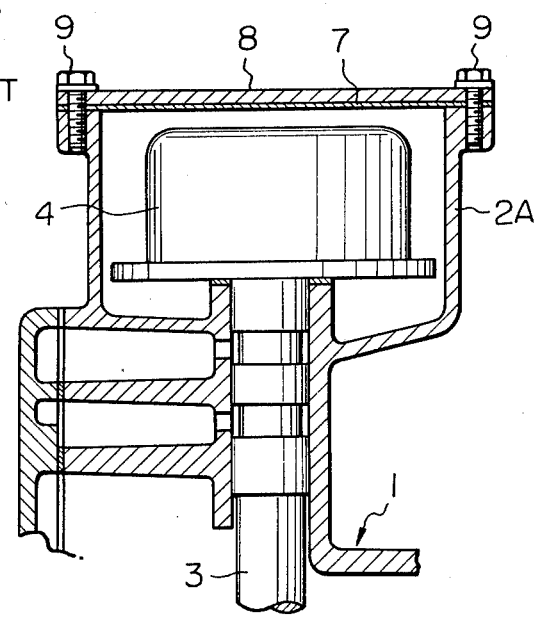

In FIG. 2, a governor case 2A is made so deep that the governor valve body 4 is entirely encased. Accordingly a cap 8 for this governor case 2A takes the form of a flat disc or lid. The governor case 2A is flanged at its endmost portion to provide an annular and flat surface around the open end of the case 2A, and a plurality of tapped holes are formed in the flanged portion in a circumferential arrangement. The cap 8 has bolt holes in its peripheral region and is fastened to the governor case 2A by means of bolts 9 with the interposal of a gasket 7.

Neither of these conventional capping methods is favorable to mass production for the reasons described hereinbefore.

In an embodiment of the present invention illustrated in FIGS. 3–5, a governor case 20 corresponding to the governor case 2 of FIG. 1 has a cylindrical wall 20a over a certain length from a circular open end. Preferably an annular flange 20c is formed in a middle region of the cylindrical wall 20a such that a rear side (a side remoter from the open end of the case 20) of the flange 20c provides a flat and annular surface 20b which perpendicularly intersects the outer surface of the cylindrical wall 20a. The transmission case 1, governor shaft 3, governor valve body 4, base plate 13 and the thrust washer 15 are respectively identical with those in FIG. 1. In FIG. 4, reference numeral 14 indicates oil passages formed through the base plate 13. The governor case 20 is formed together with the transmission case 1 by casting, and only an endmost region of the cylindrical wall 20a is machined subsequently so as to give a smooth-finished outer srface 20d for the installation of an O-ring 6A. To prevent axial movement (upwardly in FIG. 3) of the governor shaft 3, a pin 16 is partly inserted into a hole (not appearing in the section of FIG. 3) bored in an inner wall of the governor case 2 so as to pass through a circumferential groove of the shaft 3.

A generally bowl-shaped cap 10 for this governor case 20 is cylindrical in its open end portion 10a. In this portion 10a the cap 10 has an inner diameter larger than the outer diameter of the flange 20c of the governor case 20. In the cylindrical end portion 10a of the cap 10, a plurality of arcuate slits 11 are formed circumferentially of the cap 10 at intervals which are somewhat longer than the circumferential length of each slit 11. In the illustrated embodiment, the cap 10 is formed with three identical slits 11 at regular intervals such that one of four poits which divide the circumference of the cylindrical wall 10a into four equal arcs becomes the center of each slit 11. This cap 10 is a one-piece member produced by press-forming of a sheet metal, and the slits 11 can be formed by a piercing operation using a press.

To fasten the cap 10 to the governor case 20, the present invention utilizes a resilient fastener 12, which is a sring steel wire curved into a generally arcuate shape in compliance with the curvature of the cylindrical end portion 10a of the cap 10 and locally subjected to bending so as to form three inward and generally V-shaped projections 12a at intervals corresponding to the intervals between the three slits 11 in the cap 10. The total circumferential length of this fastener wire 12 is somewhat longer than the half of the outer circumference of the cylindrical end portion 10a of the cap 10.

The inner diameter of the cap 10 in a cylindrical portion 10b adjacent the end portion 10a is reduced such that the O-ring 6A fitted around the smooth-finished surface 20d of the governor case 20 is adequately squeezed when the cap 10 is put on the governor case 20.

In assemblage, first the cap 10 alone is put on the governor case 20 fitted with the O-ring 6A. Although the cap 10 is considerably larger in diameter than the cylindrical wall 20a and the flange 20c of the governor case 20, the cap 10 can rest in a nearly proper position because of the provision of the O-ring 6A. Then the cap 10 is fastened to the governor case 20 by inserting the inward projections 12a of the fastener wire 12 respectively into the three slits 11 of the cap 10 until the apex of each projection 12a comes into contact with the outer surface of the cylindrical wall 20a of the governor case 20. In the case of the cylindrical wall 20a being formed with the flange 20c, the cap 10 is brought to such a position that a middle portion of each projection 12a comes into contact with the rear surface 20b of the flange 20c. Since the fastener 12 is of a spring steel wire, the inward projections 12a engage with the slits 11 of the cap 10 and contact the governor case 20 with frictional force. Accordingly the cap 10 remains motionless relative to the governor case 20. The flange 20c is quite effective for surely preventing the cap 10 from coming off.

The capping method illustrated in FIGS. 3–5 has manifold advantages over the conventional methods illustrated in FIGS. 1 and 2.

The governor case 20 need not be threaded or formed with tapped holes and can be used in the as-cast state except that only the endmost portion 20d of the outer surface is subjected to a simple machining process. Naturally this governor case 20 can be produced at a lower cost than the governor cases 2 and 2A designed according to conventional capping methods.

The cap 10 can be easily produced by press-forming of a sheet metal followed by a piercing process and hence is quite favorable to mass production. The fastener 12, too, is easy to produce.

Fastening of the cap 10 to the governor case 20 can be accomplished quickly merely by pushing the fastener wire 12 against the cylindrical wall 10a of the cap 10 so as to insert the inward projections 12a into the slits 11 all at once. This can be completed practically by one action. Unfastening of the cap 10 is also accomplished easily and quickly merely by pulling out the fastener 12.

What is claimed is:

1. A combination comprising:
    a governor case containing governor valve means for producing a governor pressure in an automotive automatic transmission, said governor case having a cylindrical first wall surrounding said governor valve means, said first wall having an open end providing access to said governor valve means,
    a cap member having a cylindrical second wall with a plurality of circumferentially spaced openings therein, said cap member being adapted to cooperate in totally spaced relationship with said governor case to close said open end by axially receiving said first wall within said second wall, with the respective outer and inner diameters of said first and second walls being such that there exists an annular space therebetween,
    a resilient annular seal located in said annular space in sealing contact with said first and second walls, and a removable resilint fastener surrounding at least a portion of said second wall, said fastener having sections which protrude inwardly through the openings in said second wall and across said annular space into contact with said first wall, said first wall including means coacting with said inwardly protruding fastener sections to prevent axial separation of said first and second walls.

2. The combination as claimed in claim 1 wherein said means coacting with said inwardly protruding fastener sections comprises an external annular shoulder on said first wall.

3. A combination according to claims 1 or 2, wherein said cap member is a one-piece member formed by press-forming sheet metal.

4. The combination as claimed in claim 1 wherein there are three of said openings arranged such that radial reference lines dividing the circumference of said second wall into four equal arcs will pass through the centers of said openings.

5. The combination of claim 1 wherein said removable resilient fastener comprises a metal wire arranged in a plane parallel to the bottom edge of said second wall.

6. The combination of claim 5 wherein the free ends of the fastener wire are disposed outside of the cap.

7. The combination of claim 1 wherein said means comprises an external annular shoulder on said first wall, with the inwardly protruding fastener sections being in engagement with the underside of said shoulder, and with said resilient annular seal being located above said shoulder.

8. The combination of claim 1 wherein said removable resilient fastener has a generally semi-circular shape with a plurality of V-shaped inwardly protruding sections arranged to enter said circumferentially spaced openings when said fastener is removably mounted around said second wall.

* * * * *